(12) United States Patent
Papke et al.

(10) Patent No.: US 6,998,564 B2
(45) Date of Patent: Feb. 14, 2006

(54) STUD WELDING GUN WITH STUD DETECTION SYSTEM

(75) Inventors: Reed Robert Papke, Allen Park, MI (US); Richard Louis Eberling, St. Clair, MI (US)

(73) Assignee: Newfrey LLC, Newark, DE (US)

( * ) Notice: Subject to any disclaimer, the term of this patent is extended or adjusted under 35 U.S.C. 154(b) by 157 days.

(21) Appl. No.: 10/418,557

(22) Filed: Apr. 18, 2003

(65) Prior Publication Data

US 2004/0206727 A1 Oct. 21, 2004

(51) Int. Cl.
*B23K 9/20* (2006.01)

(52) U.S. Cl. .......................................................... 219/98
(58) Field of Classification Search .................. 219/98, 219/99
See application file for complete search history.

(56) References Cited

U.S. PATENT DOCUMENTS

| | | |
|---|---|---|
| 3,546,420 A | 12/1970 | Ettinger et al. |
| 3,582,602 A | 6/1971 | Ettinger et al. |
| 3,723,700 A | 3/1973 | Ettinger |
| 4,267,425 A | 5/1981 | Kondo |
| 4,415,792 A * | 11/1983 | Jordan .......................... 219/98 |
| 4,417,120 A | 11/1983 | Lumbra et al. |
| 4,988,842 A | 1/1991 | Van Allen |
| 6,239,401 B1 | 5/2001 | McCardle et al. |
| 2003/0132202 A1 | 7/2003 | Madsak et al. |

FOREIGN PATENT DOCUMENTS

| | | |
|---|---|---|
| DE | 43 24 223 A1 | 1/1995 |
| JP | 7-136766 | 5/1995 |

OTHER PUBLICATIONS

European Search Report Mar. 31, 2005, 4 pages.

* cited by examiner

*Primary Examiner*—Clifford C. Shaw
(74) *Attorney, Agent, or Firm*—Harness, Dickey & Pierce, P.L.C.

(57) ABSTRACT

A stud welding gun includes a closed conductivity path indicating a stud properly positioned for welding. Another aspect includes a conductivity detection circuit closed when a stud is present. A further aspect provides a method to operate a stud welding gun including closing a conductivity path to permit a welding operation. A still further aspect provides a method to detect a stud presence by passing a conductivity current from a conductivity detection circuit through a conductivity path closed by a stud.

30 Claims, 13 Drawing Sheets

STUD WELDING GUN WITH STUD DETECTION SYSTEM

BACKGROUND

The invention relates generally to stud welding and more particularly to a stud gun and method for using a stud gun having a stud confirmed in location for welding prior to initiating a welding sequence.

Stud welding guns are used to weld a variety of sizes of studs onto various work pieces for further attachment of additional items to the work pieces. Stud welding guns are widely used in the automotive industry to attach studs for further attachment of trim pieces on automobiles. Furthermore, stud welding guns can be used in both a manual and an automated system. Studs for use in a stud welding gun include a shaft or body often having a smooth or fastener threaded surface, and are formed of electrically conductive material. A welding current is passed through the stud which creates an arc used to fuse the stud to an electrically conductive surface (that is (i.e.), the work piece).

Common stud welding guns operate by feeding an individual stud to a collet or similar chuck device which temporarily holds the stud. The stud is then positioned approximate a work piece and a small electric current passed through the stud creates an arc between the stud and the work piece. Once the arc forms, a full welding current is applied between the stud and the work piece to generate a fusion area between the two. The stud is then rammed into the fusion area to complete the welding process. A disadvantage may result from a stud being misaligned or missing when the collet or chuck is positioned to weld. When a stud is not in position for welding, a welding arc generated between the collet and the work piece results in the collet potentially being welded to the work piece.

In either of the above situations, i.e., where the stud is missing and the process must be repeated to provide a stud in the appropriate location, and where the collet is inadvertently welded to the work piece, additional time and costs are incurred due to the delay in providing a stud or the rework required to remove the attached collet from the work piece. Stud welding gun systems are known which provide a conductivity check using a circuit path including the work piece such that the presence of a stud in position for welding is required before the arc current is generated to start the welding process. The potential for inadvertently welding the collet to the work piece is still present with these systems because the conductivity circuit is completed through the work piece, therefore requiring the stud welding gun and collet to be brought into close alignment with the work piece.

It is therefore desirable to provide a stud welding gun and stud welding gun system which reduces the potential for starting a welding process when a stud is not present and reduces the potential for welding the collet to the work piece.

SUMMARY OF THE INVENTION

In accordance with a preferred embodiment of the present invention, a stud welding gun includes a gun body having a collet mechanically and electrically connected to a receiver. A ram disposed in the receiver section is contacted by a biased conductive element. A conductive stud is driven into physical contact with the collet by the ram which closes a conductivity path through the conductive element, ram, metallic stud, collet, and receiver. A closed conductivity path indicates a stud properly positioned for welding. The conductivity path is formed in the stud welding gun, independent of a work piece.

A conductivity detection circuit in communication with the stud welding gun is connected external to the stud gun. The conductivity detection circuit applies a small voltage potential across the conductivity path. The conductivity path is closed and a small conductivity current flows when a stud is present and open when a stud is absent. A stud welding gun having a conductivity detection circuit of the present invention prevents the application of a welding current if a stud is not present, and therefore the conventional potential to weld the collet to the work piece. A stud welding gun of the present invention also improves cycle time (i.e., the time to feed a new stud before attempting to weld).

The conductive element is mechanically connected to the stud welding gun and includes a biasing device to bias the conductive element into contact with the ram. By insulating the ram from the stud welding gun, the biased conductive element permits conductivity current flow through the ram, without shorting through the gun body. The addition of the conductive element of the present invention provides a low cost, efficient way to modify a known stud welding gun to connect a closed loop conductivity path to the stud welding gun.

A method of operating a welding gun with a stud and a method of detecting a stud presence in a stud welding gun are also provided.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is a diagrammatic view similar to FIG. 5 showing the initial step of retracting the ram to initiate a stud welding sequence;

FIG. 7 is a diagrammatic view similar to FIG. 6 showing a new stud in position prior to pneumatic pressure being applied to the ram to press the stud into contact with the collet;

FIG. 8 is a diagrammatic view similar to FIG. 7 showing the ram contacting the stud to drive the stud into contact with the collet;

FIG. 9 is a diagrammatic view similar to FIG. 8 showing the new stud in contact with the collet, closing the conductivity path and initiating a next welding sequence;

DETAILED DESCRIPTION OF THE PREFERRED EMBODIMENTS

The following description of the preferred embodiments is merely exemplary in nature and is in no way intended to limit the invention, its application, or uses.

Figure 1:
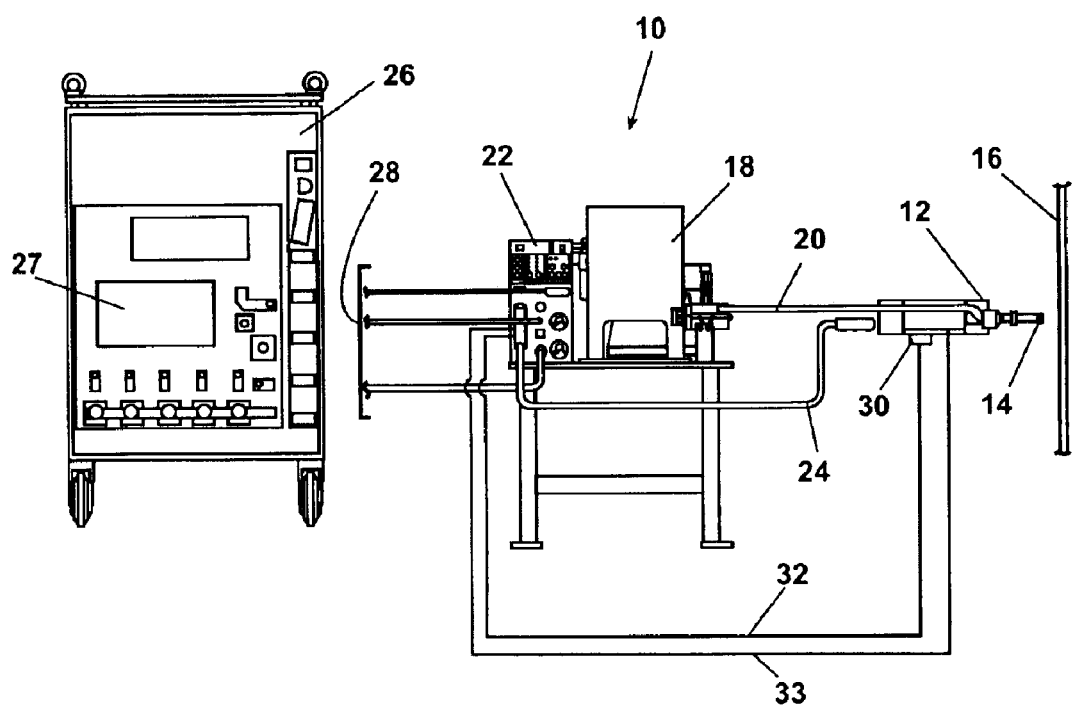
FIG. 1 is a diagrammatic view identifying a component system for performing stud welding using a modified stud welding gun according to the preferred embodiment of the present invention.

FIG. 1 shows a stud welding gun of the preferred embodiment of the present invention. A stud detection system 10 includes a stud gun 12 holding a stud 14 in position for welding to a work piece 16. It is envisioned that work piece 16 is a steel, sheet metal automobile panel. Each stud 14 is provided via a stud feeder supply 18 and a pneumatic tube 20 to stud gun 12. A weld tool process control unit 22 is connected via a welding current supply line 24 to stud gun 12. Weld tool process control unit 22 is electrically connected on a feed side to a process control unit 26 via control lines 28. The process control unit 26 also includes a welding current supply 27. The process control unit 26 is connected to a conductive element 30 of stud gun 12 and a body of the stud gun 12 via conductivity signal lines 32 and 33, respectively. Alternately, conductivity signal lines 32 and 33 can be included with welding current supply line 24. Process control unit 26 also includes a microprocessor, a memory unit, an input device (e.g., a keyboard) and a display screen, as known in the art.

Figure 2:
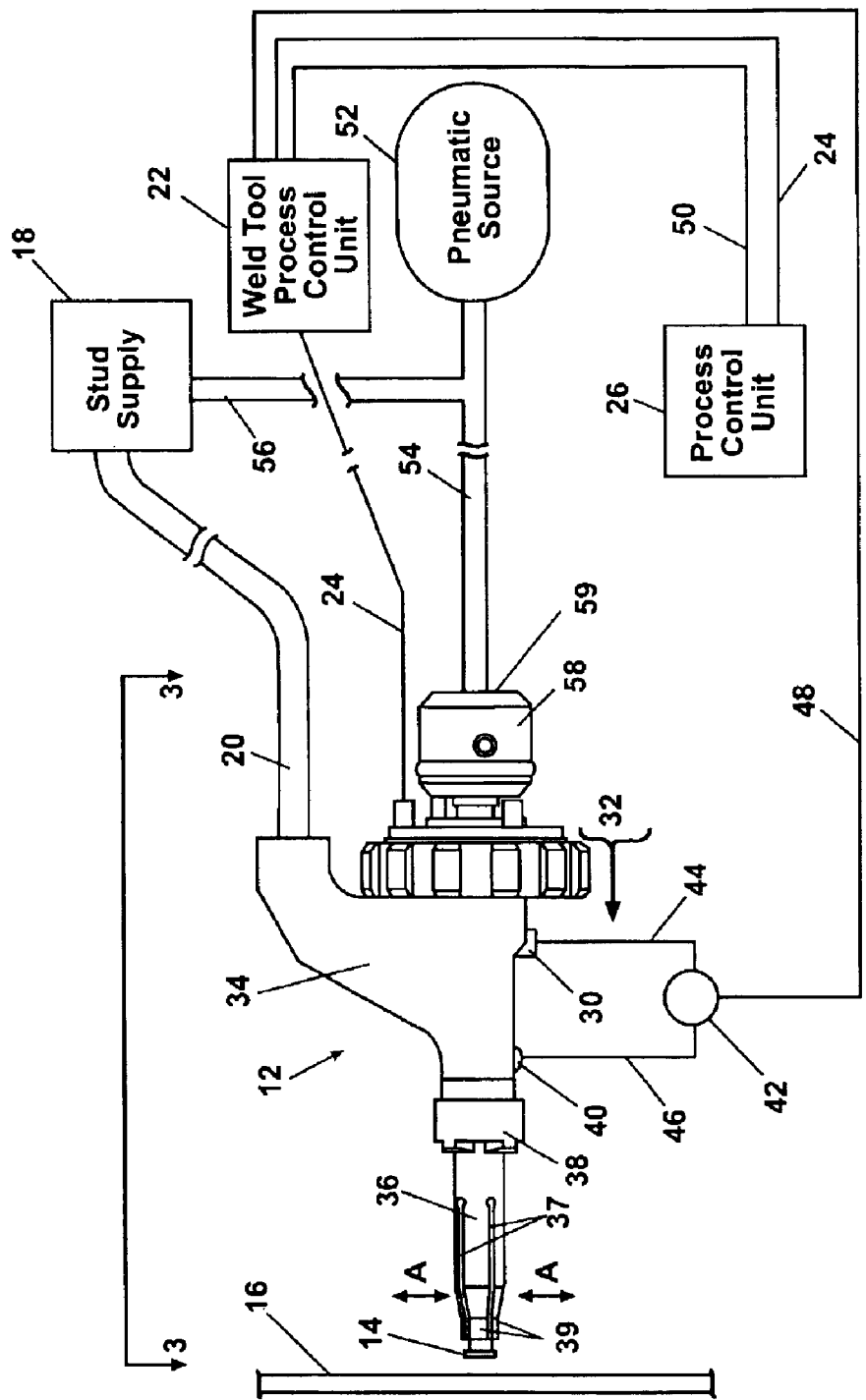
FIG. 2 is a diagrammatic view simplified from FIG. 1, further showing an exemplary conductivity detection circuit connected to the stud welding gun.

Referring now to FIG. 2, stud gun 12 includes a receiver 34, a collet 36 having a plurality of longitudinal slits 37, and a union 38 which connectably joins collet 36 to receiver 34. Longitudinal slits 37 provided in collet 36 enable the distal end of collet 36 to radially expand and contract about the changing diameter of a stud 14 in the direction of radial arrows "A". A positive grip is therefore maintained on stud 14 by the biasing force provided by a plurality of deflectable portions 39 of collet 36 between longitudinal slits 37. Conductive element 30 is releasably connected to receiver 34 such that conductive element 30 can be removed and replaced. In the preferred embodiment, the outer diameter of conductive element 30 has male threads (not shown) which engage associated female threads (not shown) of receiver 34. An electrical ground connection 40 is also provided on receiver 34 whose purpose will be further described in reference to FIG. 4.

Stud gun 12 is connected to a conductivity detection circuit 42 via a conductive element line 44 connected to conductive element 30 and a ground path line 46 connected to ground connection 40. Conductivity detection circuit 42 is connected to weld tool process control unit 22 via at least one signal line 48. Weld tool process control unit 22 is connected to welding current supply 27 of process control unit 26 via a conductivity signal line 50. These lines are further described in reference to FIG. 12.

A pneumatic pressure source 52 is connected to stud gun 12 via a pressure tube 54 and is connected to the stud feeder supply 18 via a stud supply pressure tube 56. The pneumatic pressure source 52 provides a source of positive pressure for driving the stud 14 into the receiver 34 via the pneumatic tube 20, and for driving the stud 14 into the welding position shown (as will be described in reference to FIG. 3). The pressure tube 54 connects to a piston head 58 of the stud gun 12 at a piston head cap 59. A stud 14 shown in proper position for welding deflects the deflectable portions 39 of the collet 36 in the radial deflection direction "A" as shown.

Figure 3:
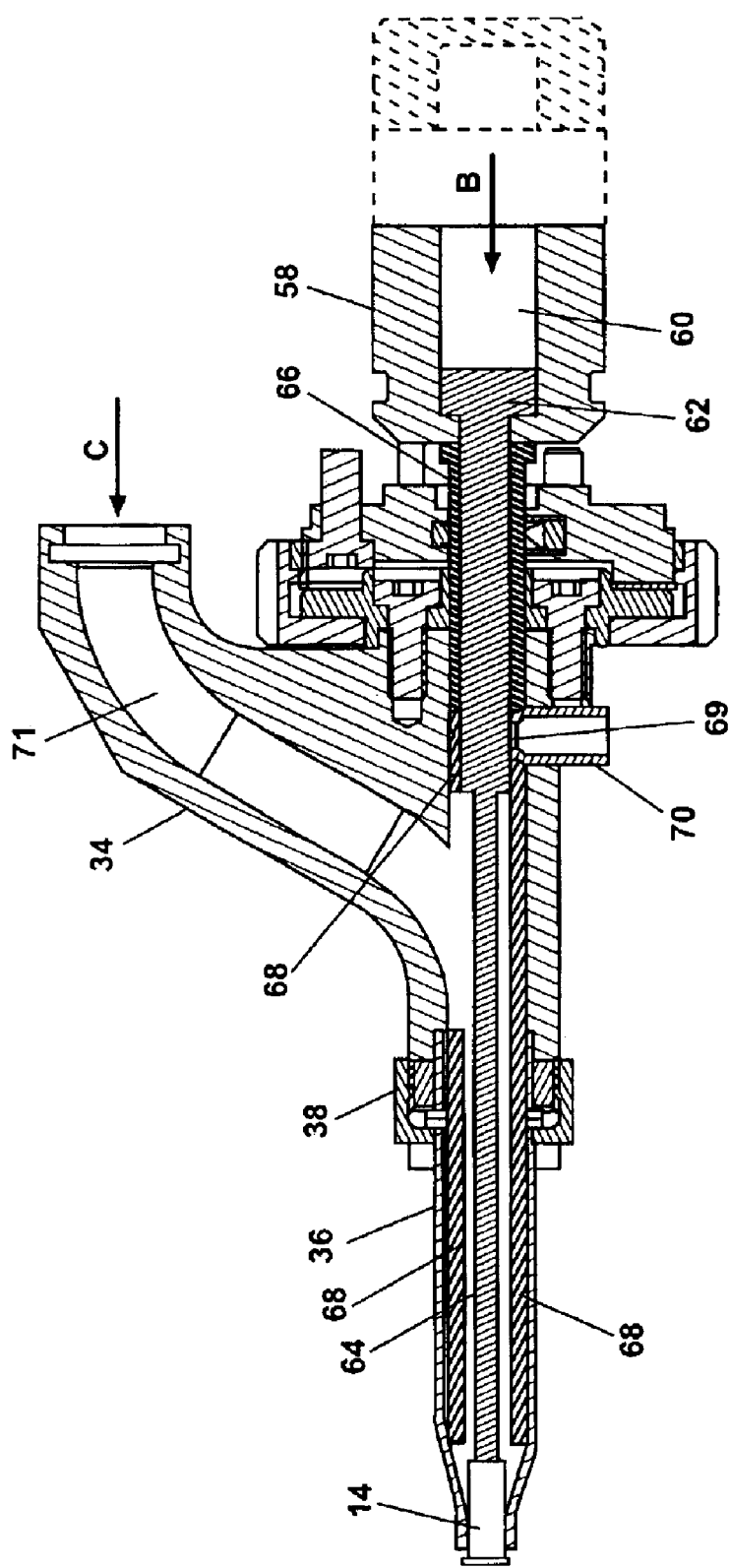
FIG. 3 is a cross section view taken through the stud welding gun of FIG. 2.

As best seen in reference to FIG. 3, piston head 58 receives air from pneumatic pressure source 52 (shown in FIG. 2) in a chamber 60, operable to advance piston 62 in a linear direction "B". The pneumatic fluid acts on a piston 62 having a distally extending ram 64 attached thereto. The ram 64 in turn contacts stud 14 to drive stud 14 into the position shown for welding in the linear direction "B". Ram 64 is slidably disposed within receiver 34 in a bearing sleeve 66. Ram 64 is electrically isolated from receiver 34 by insulation 68 circumferentially surrounding ram 64. Bearing sleeve 66 is also preferably provided of a non-conductive material such as a polyamide to further electrically insulate ram 64 from receiver 34.

An aperture 69 within insulation 68 is provided for exposing a contact surface of ram 64. A conductive element housing 70 is removably disposed in receiver 34 in alignment with aperture 69 in insulation 68. The conductive element housing 70 is a non-conductive material. Studs are received in receiver 34 in a stud loading direction "C" via a delivery tube 71 when ram 64 retracts in a piston upstroke direction "E" (as further described in reference to FIG. 6). This overall process is fully described with reference to FIGS. 5–9. Collet 36 is necessarily a conductive material (e.g., copper) which is releasably fastened to the conductive material of receiver 34 via union 38. The union 38, receiver 34, and ram 64 are electrically conductive materials such as copper or steel, which when mechanically linked, form a portion of a conductivity path for stud gun 12, as further discussed below. The conductivity path is closed when a stud 14 is present, and open when a stud 14 is absent.

Figure 4:
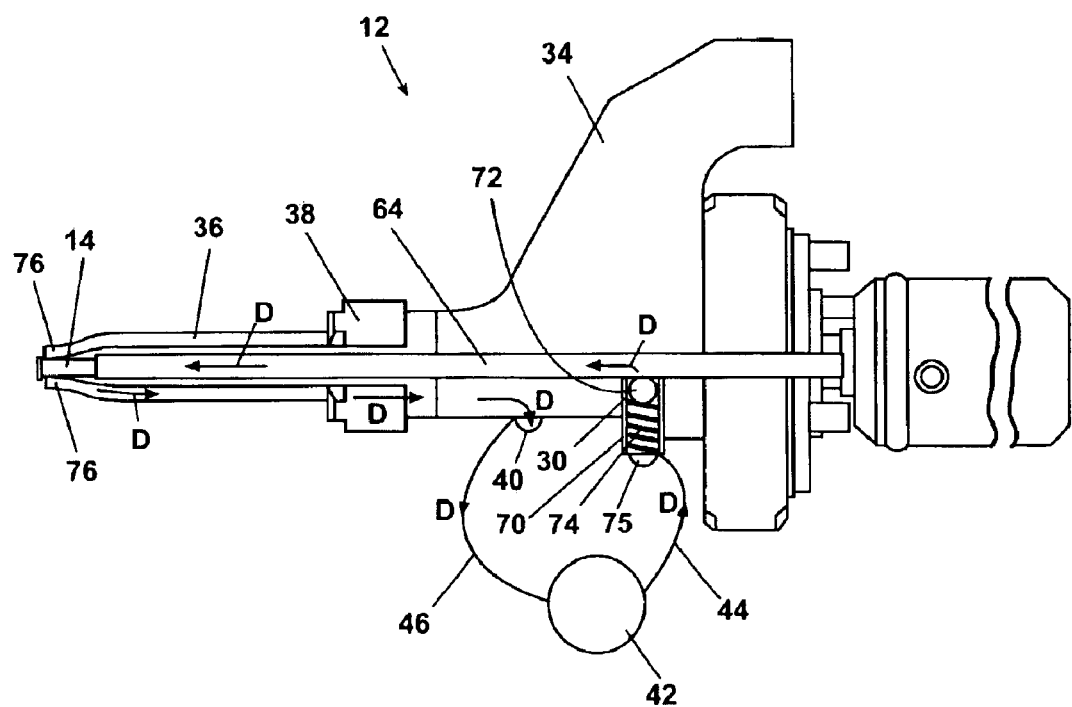
FIG. 4 is an elevational view of the preferred embodiment stud gun identifying a conductivity current flow path completed via the conductivity detection circuit and the conductive element.

As detailed in FIG. 4, a conductivity current flow path for the preferred embodiment is shown by arrows D through a closed conductivity path. A ball 72 is slidably disposed within conductive element housing 70. A compression spring 74 is connectably attached to ball 72 at a first end and to an electrical contact 75 at a second end. Ball 72, conductive element housing 70, compression spring 74, and electrical contact 75 form conductive element 30. Compression spring 74 is preferably a coil spring (as shown) but can also be any type of spring or biasing means capable of providing an electrical contact path between ball 72 and electrical contact 75. Compression spring 74 biases ball 72 into contact with ram 64.

Ram 64 advances in the linear direction "B" until stud 14 contacts and is held by contact surfaces 76 at the distal end of collet 36. With stud 14 in the position shown, a conductivity path closes between conductivity detection circuit 42 via conductive element line 44, electrical contact 75, compression spring 74, ball 72, ram 64, stud 14, contact surfaces 76, collet 36, union 38, receiver 34, receiver ground connection 40, and ground path line 46, respectively. The conductivity current flow path is exemplified by direction arrows D. When the conductivity circuit path closes as shown, conductivity detection circuit 42 directs a signal (described in detail with reference to FIGS. 11 and 12) to weld tool process control unit 22 (shown in FIG. 2) indicating that a stud 14 is in position for welding. The weld tool process control unit 22 then signals welding current supply 27 (within process control unit 26) to initiate a welding sequence. When no stud 14 is present, the conductivity circuit path is open. A length of ram 64 is controlled to prevent ram 64 contacting the contact surfaces 76 for any position of ram 64.

Figure 5:
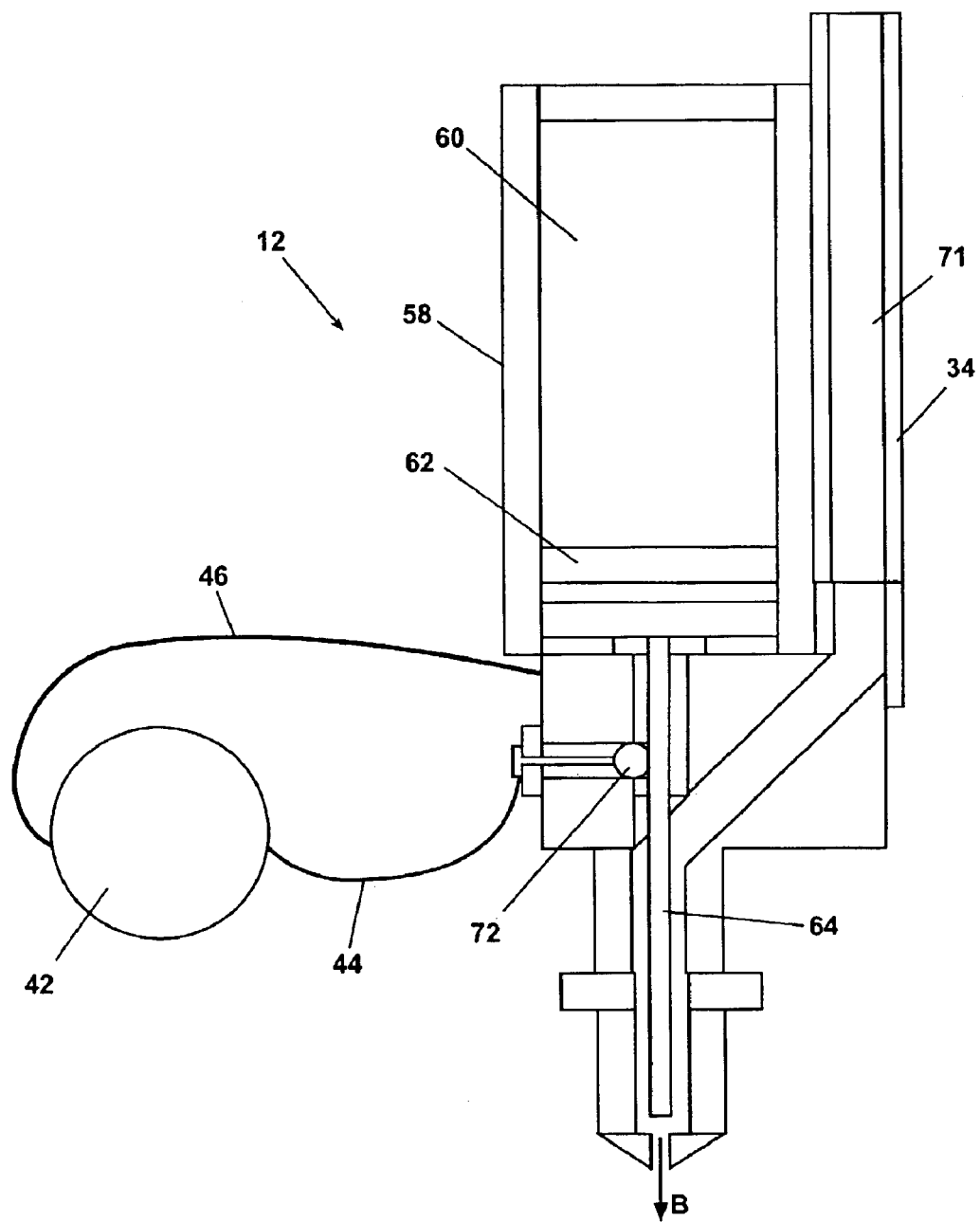
FIGS. 5–9 are a series of diagrammatic views showing the preferred embodiment stud welding gun throughout a welding procedure.

Referring now to FIGS. 5–9, the sequence for loading a new stud, the delivery of the stud to the collet and the welding of the stud will be described. FIG. 5 shows stud welding gun 12 following a completed welding cycle (i.e., a previous stud is not shown) and ram 64 is fully extended in the ram linear direction "B". Piston 62 is in a fully extended position within piston head 58 and chamber 60 is fully pressurized. Ball 72 is biased into contact with ram 64, however, the absence of a stud results in an open conductivity path in conductivity detection circuit 42.

Figure 6:
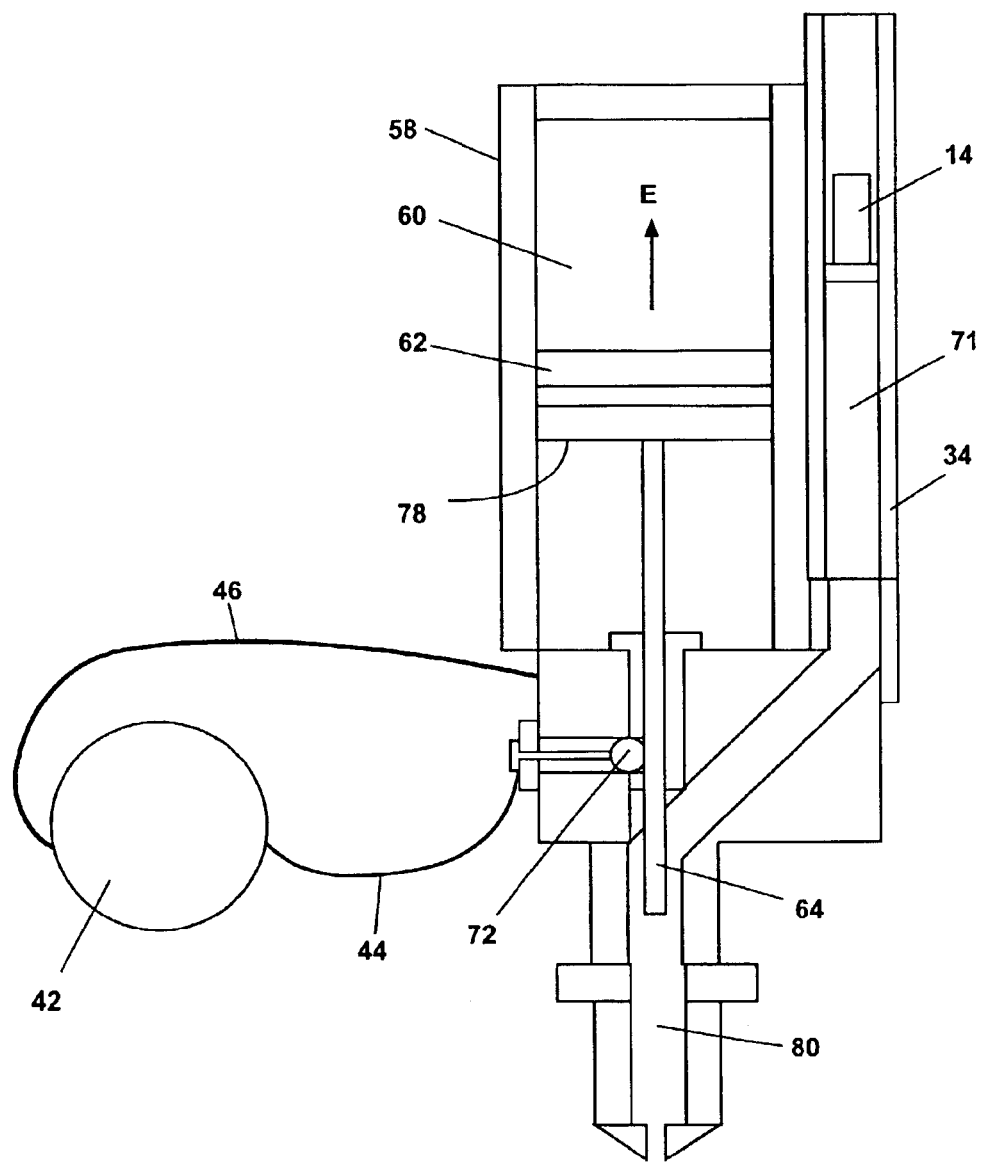

FIG. 6 shows the initiation of a stud loading step. Pneumatic pressure from pneumatic pressure source 52 (shown in FIG. 2) is applied to a piston bottom face 78 to drive piston 62 in the piston upstroke direction "E" as shown. Pressure in chamber 60 is released to permit piston 62 to travel in piston upstroke direction "E". Ram 64, which is connectably disposed to piston 62, retracts in piston upstroke direction "E". Stud 14 is pneumatically delivered through delivery tube 71 of receiver 34 prior to reaching a stud chamber 80.

Figure 7:
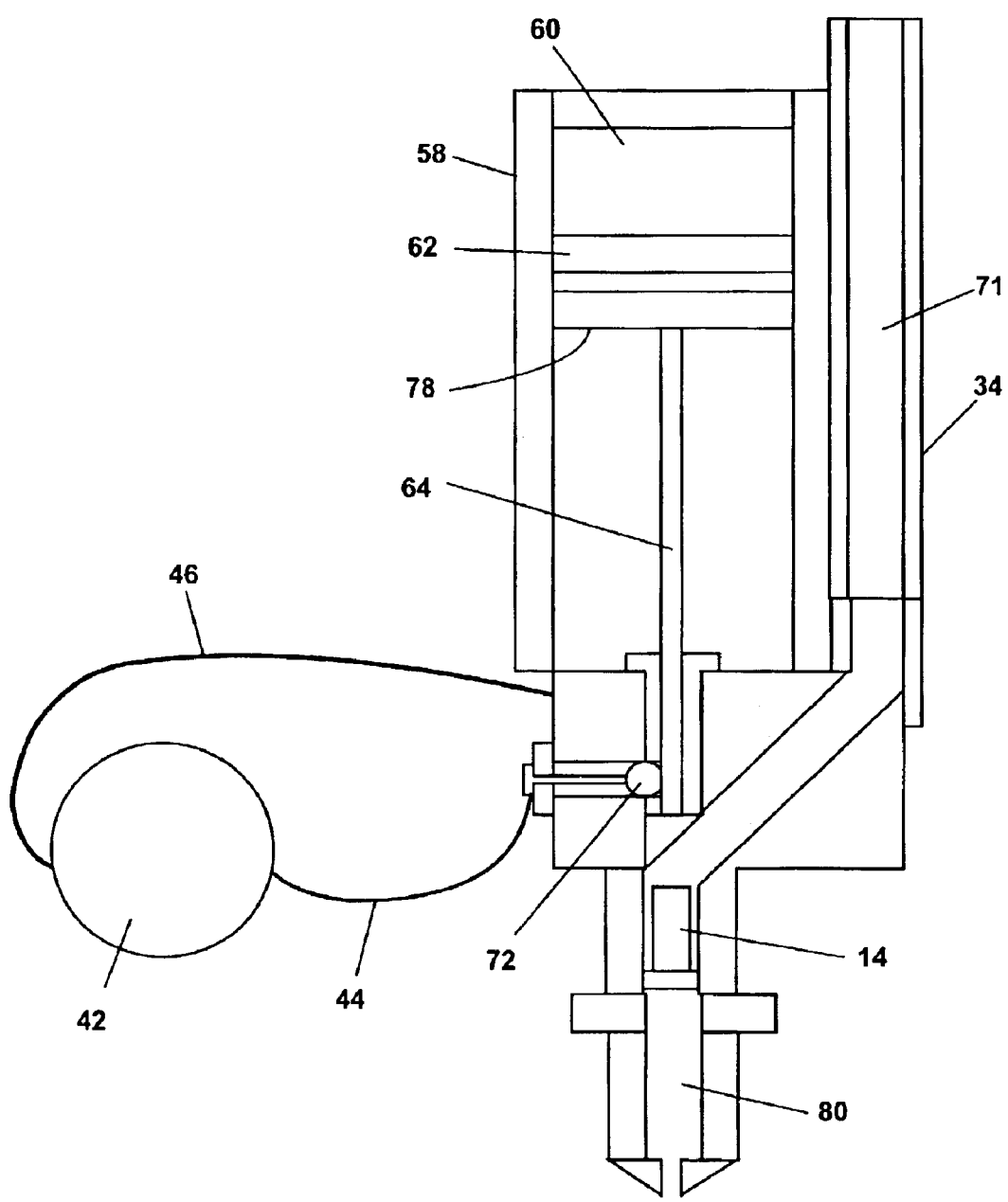

FIG. 7 shows stud 14 positioned within stud chamber 80 prior to ram 64 being driven into contact with stud 14. Piston 62 is fully retracted prior to pneumatic pressure entering chamber 60.

Figure 8:
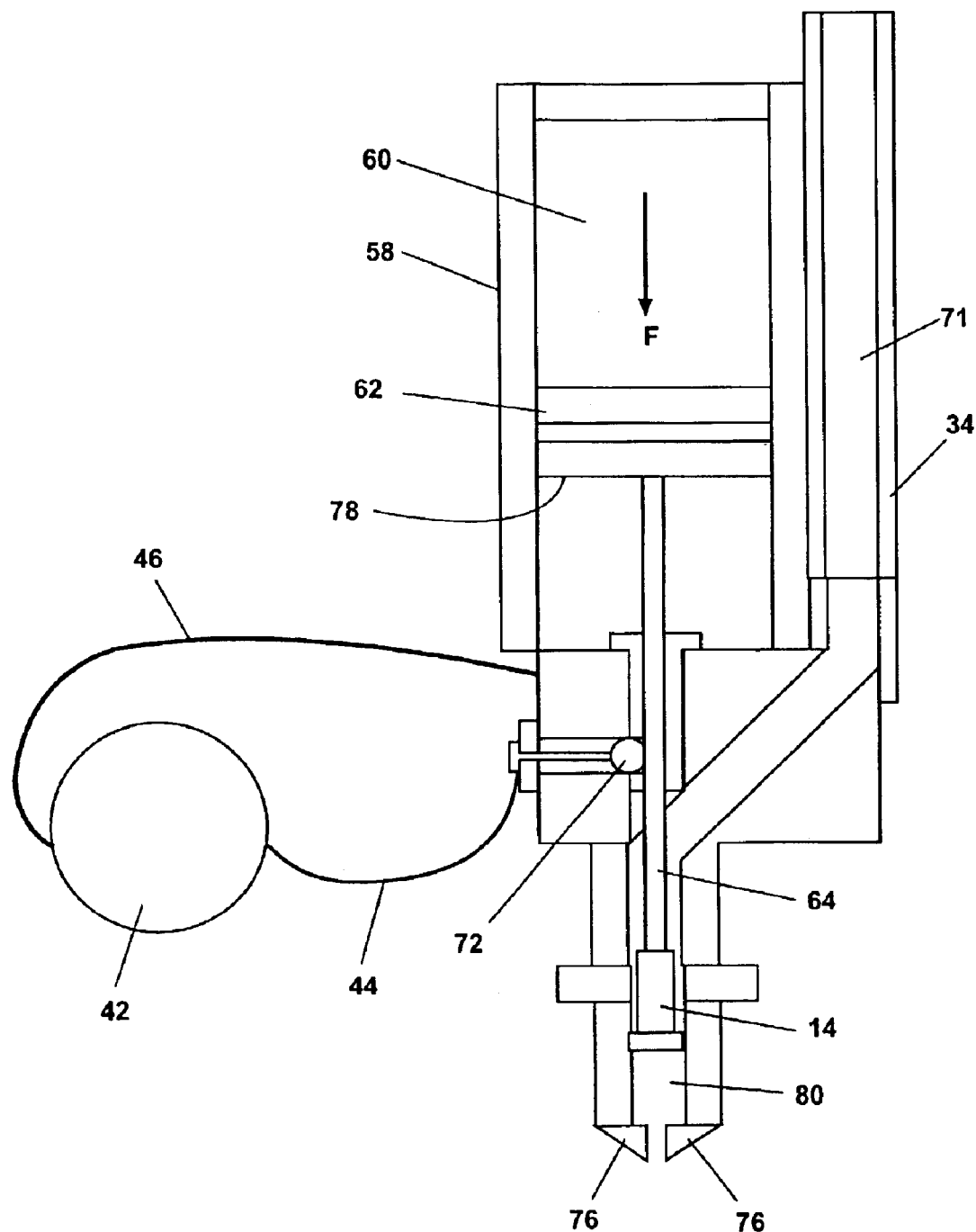

In the step shown in FIG. 8, pneumatic fluid (e.g., air) from pneumatic pressure source 52 (shown in FIG. 2) is directed into chamber 60 above piston 62 and is bled from the piston bottom face 78 side of piston 62. This process is known and is therefore not further detailed herein. Piston 62, connected to ram 64, drives ram 64 into contact with stud 14 within stud chamber 80. Although ball 72 is biased into contact with ram 64, stud 14 has not yet reached contact surfaces 76 therefore the conductivity path is still open at this time.

Figure 9:
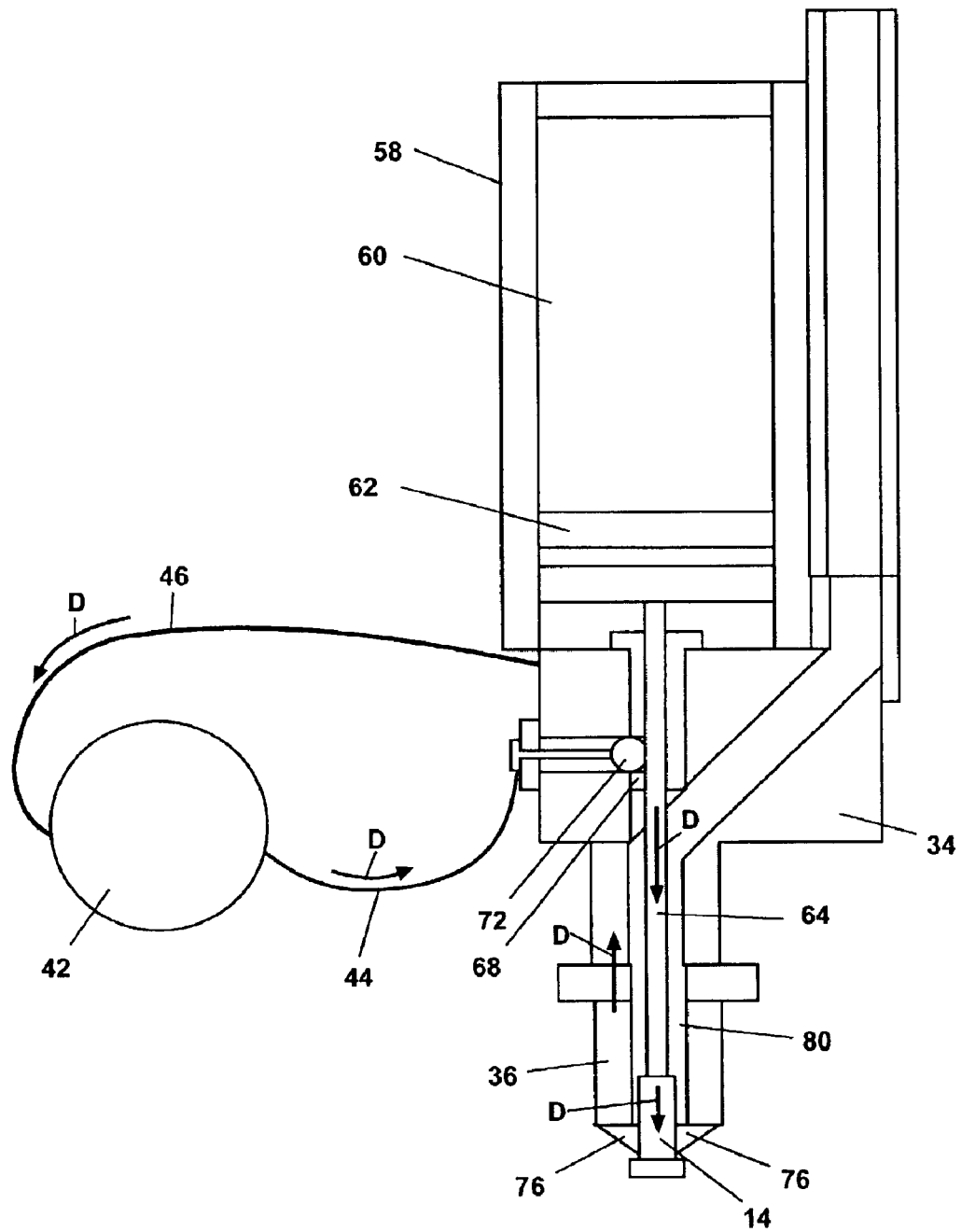

Referring to FIG. 9, ball 72 remains biased into contact with ram 64. Stud 14, driven by ram 64, physically deflects or contacts contact surfaces 76 of collet 36. A conductivity path as shown in FIG. 4 thereby closes and an electrical potential across the conductivity path induces a small current flow. The insulation 68 precludes the conductivity current from shorting between ram 64 and receiver 34. As best shown in FIG. 4, conductivity current flows through conductive element line 44, ground path line 46, and conductivity detection circuit 42 to complete the conductivity circuit. The direction of conductivity current flow is exemplary to demonstrate the components in the path.

Figure 10:
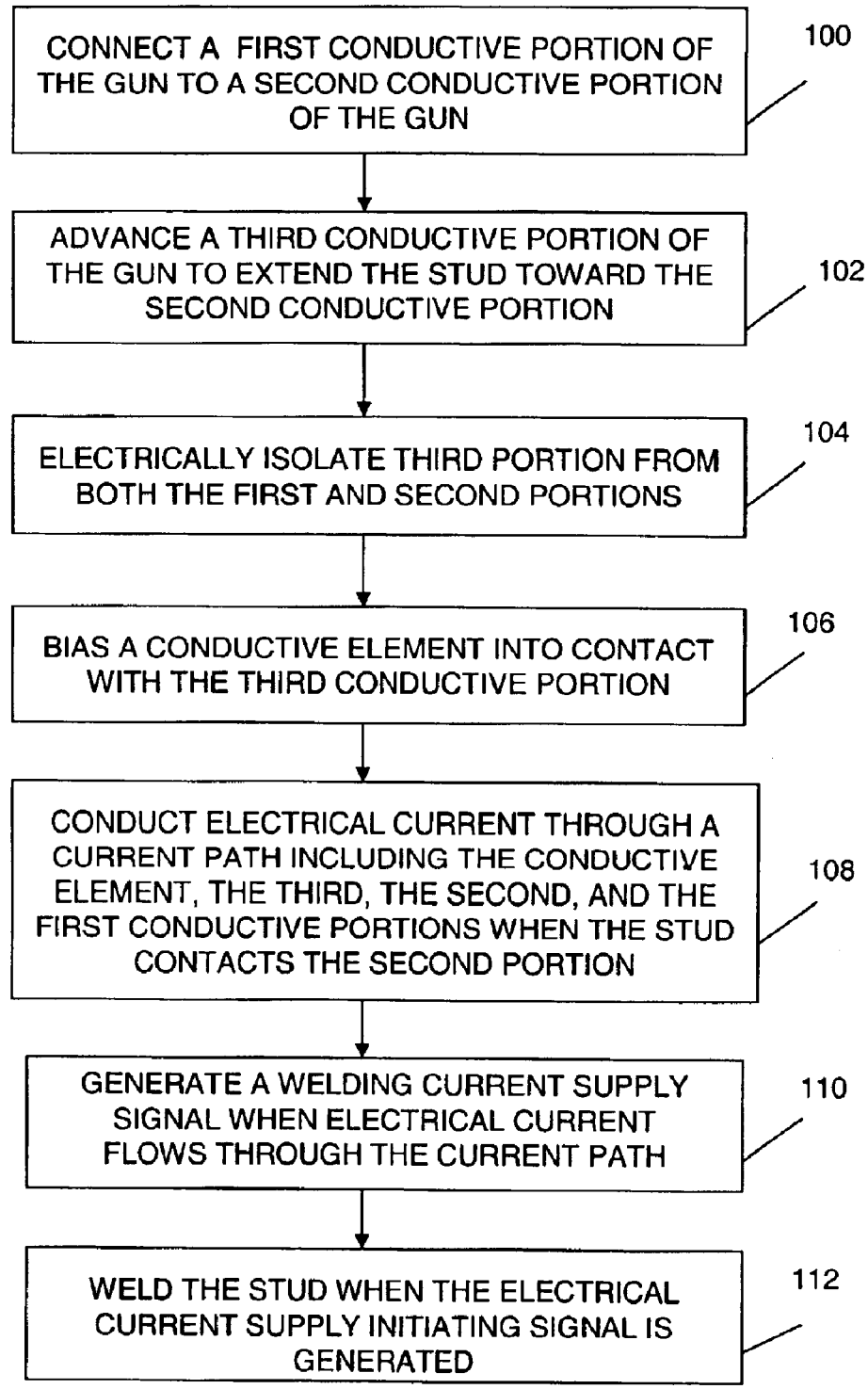
FIG. 10 is a flow chart identifying the steps to operate the stud welding gun of the preferred embodiment.

As best described with reference to FIG. 10, the steps to operate a stud welding gun having a stud detection conductivity path of the present invention are provided. In an initial step 100, a first conductive portion of the gun is mechanically and electrically connected to a second conductive portion of the gun. Next, at step 102, a third conductive portion of the gun is advanced to extend the stud toward the second conductive portion of the gun. As described by step 104, the third conductive portion is electrically isolated from both the first and second conductive portions of the gun. Further at step 106, a conductive element is biased into contact with the third conductive portion of the gun. Following at step 108, an electrical current is conducted through a current path including the conductive element, the third conductive portion, the second conductive portion and the first conductive portion of the gun when the stud contacts the second conductive portion of the gun. For step 110, a welding current supply initiating signal is generated when the electrical current flows through the current path. During final step 112, the stud is welded when the electrical current supply initiating signal is generated.

Figure 11:
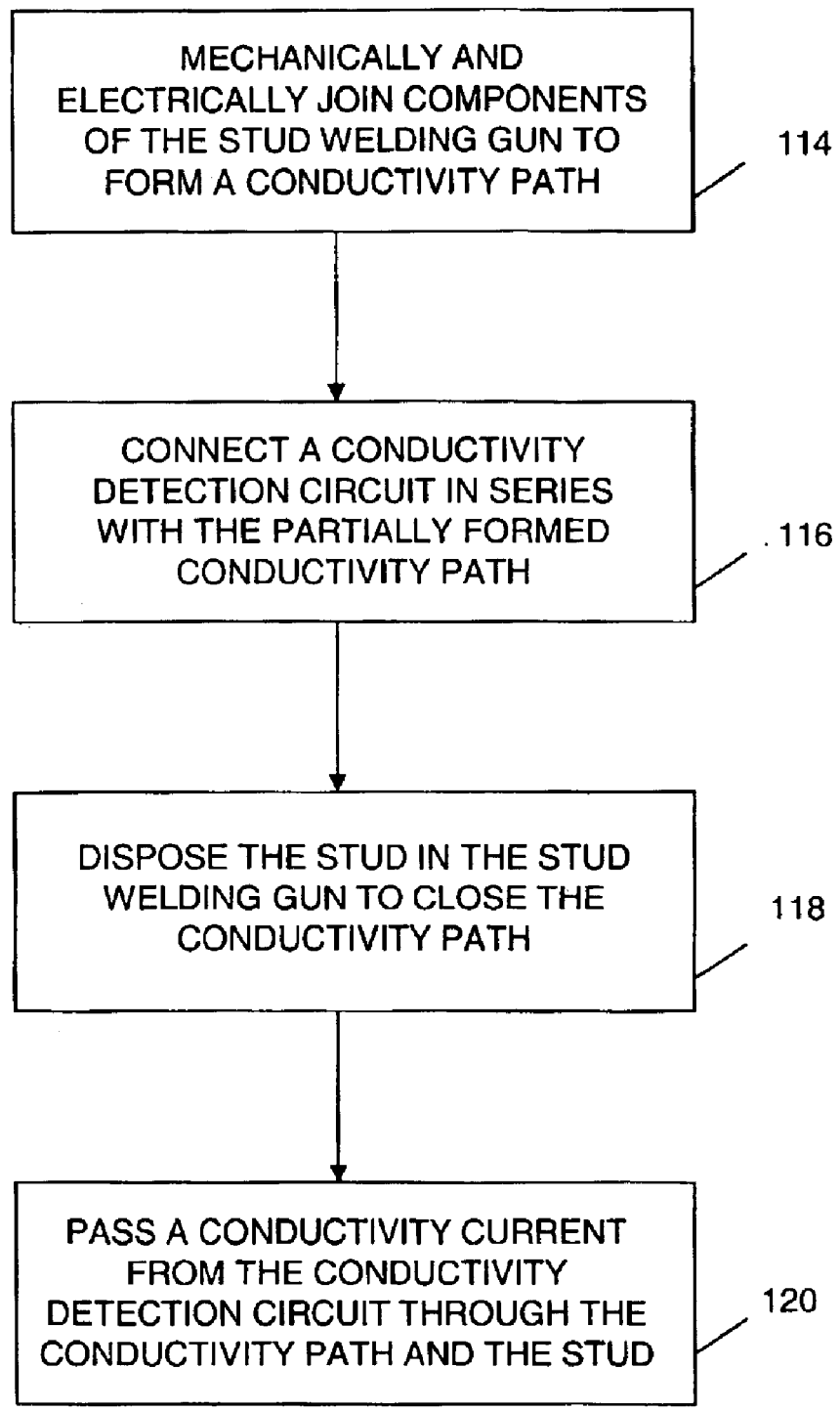
FIG. 11 is a flow chart identifying the steps to detect a stud according to the preferred embodiment.

As shown in FIG. 11, a method of detecting a stud presence in a stud welding gun is provided. At the initial step 114, components of the stud welding gun are mechanically and electrically joined to partially form a conductivity path. Next, in a step 116, a conductivity detection circuit is connected in series with the partially formed conductivity path. In a following step 118, the stud is disposed in the welding gun to close the conductivity path. In a final step 120, a conductivity current is induced to flow from the conductivity detection circuit through the conductivity path and the stud.

Figure 12:
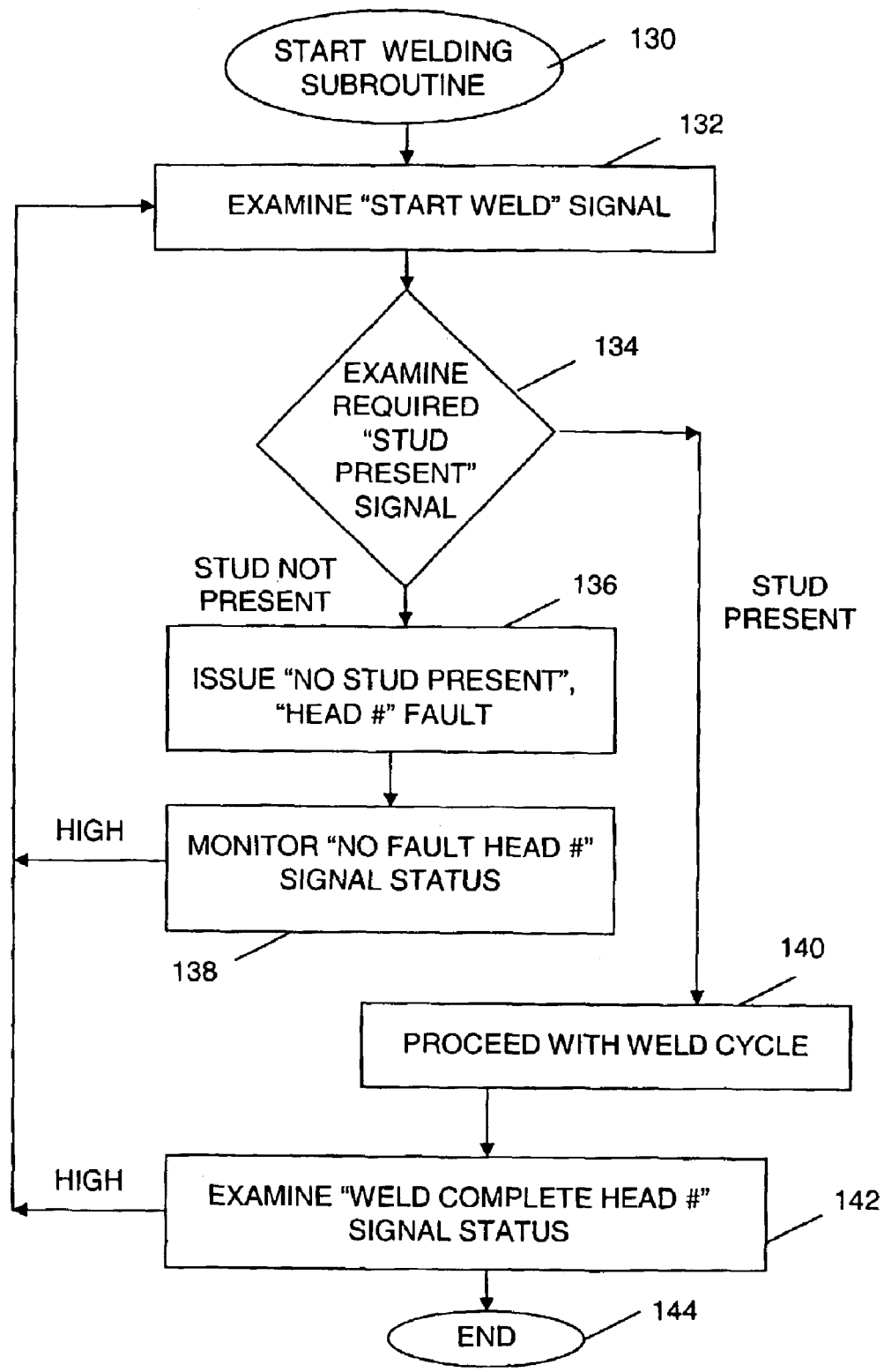
FIG. 12 is a flow chart identifying the sequence of logic and welding signals produced during a welding procedure for the preferred embodiment stud welding gun.

As best described in FIG. 12, the signals generated in the process control unit 26 (as shown in FIG. 2) during a conductivity path check are identified. At step 130, a welding subroutine is initiated. Next, during the step 132, a "start weld" signal is required to be present before a welding sequence can be initiated, and is examined if present. Following at a step 134, if a "start weld" signal is sensed, a "stud present signal" must exist and is examined if present. If a stud is not present, (i.e., a high voltage is sensed across the conductivity path in the stud welding gun, at a step 136, a "no stud present" at "head #" fault signal is generated. Following thereafter, during a step 138, the process control unit 26 monitors for a change in condition, indicated by a "no fault, head #" status signal, and if a stud is thereafter sensed, the subroutine returns to step 132. In a parallel step 140, if the voltage across the conductivity path is low (as determined during the step 134), which indicates a stud present for welding, a weld cycle is initiated. At a step 142, the process control unit 26 examines the status of a "weld complete, head #" signal and if complete, returns to step 132 to initiate a further stud welding cycle. Finally, at step 144, the process ends when all welding is complete and the system is down-powered.

Figure 13:
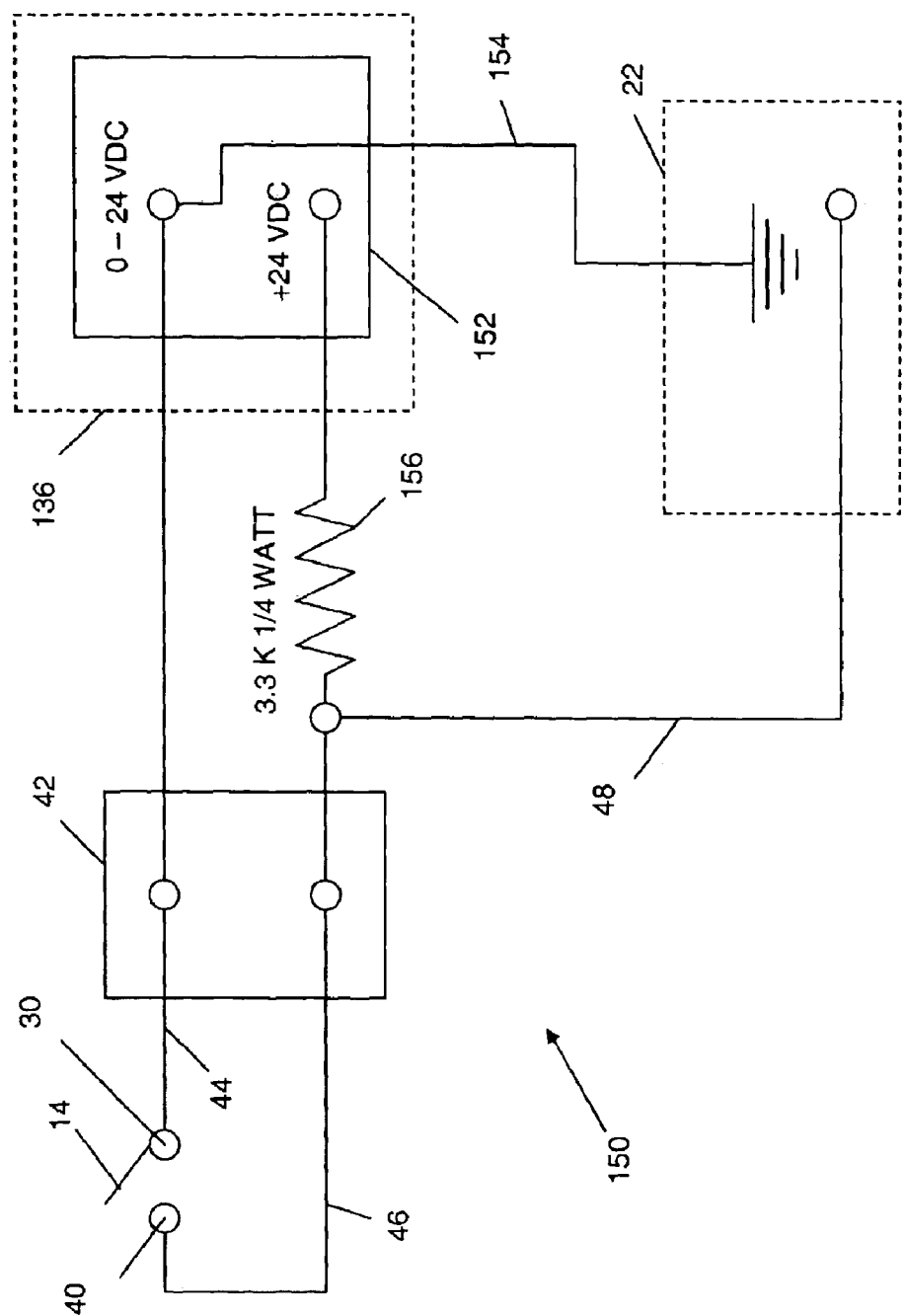
FIG. 13 is a diagrammatic view of the conductivity signal path for the preferred embodiment of the present invention.

Referring finally to FIG. 13, an exemplary circuit diagram for the preferred embodiment conductivity current path is shown. A conductivity current path 150 includes stud 14 which closes the conductivity path through stud gun 12 (best shown in FIG. 4) across conductive element 30 and ground connection 40. When stud 14 closes the conductivity path, a circuit path is completed between conductive element line 44 and ground path line 46 across the conductivity detection circuit 42. A 24 volt direct current (DC) voltage potential provided by a voltage source 152 in weld tool process control unit 22 causes a small current flow through conductivity detection circuit 42. The voltage potential across signal line 48 and a ground path line 154 at process control unit 26 is "low", dropping to approximately zero. Signal line 48 therefore produces a "low" voltage signal, indicating a "stud present" condition.

Conversely, if stud 14 is not present, the conductivity path across conductivity detection circuit 42 remains open. The voltage potential across signal line 48 and ground path line 154 at weld tool process control unit 22 is "high" (i.e., approximately 24 volts DC) owing to a resistor 156 connected between the positive terminal of voltage source 152 and signal line 48. Signal line 48 therefore produces a "high" voltage signal, indicating a "no stud present" condition. The "no stud present" condition or signal is also traceable to a particular stud welding gun 12 or head number (i.e., head #) if more than one stud gun 12 is being monitored concurrently by process control unit 26. Each "head #" is preassigned. It is noted that resistor 156 is identified as a 3.3 K-Ohm, ¼ Watt resistor. This resistor size is exemplary of a variety of resistor sizes possible for the stud detection system 10 of the present invention, and can vary with voltage potential across voltage source 152 and resistances in the various signal and ground lines, and equipment used.

The preferred embodiment for the stud welding gun of the present invention is exemplary in nature. In the preferred embodiment, the conductive element 30 includes a ball biased into contact with the ram by a compression spring. In alternate embodiments, the ball can be replaced by any suitable shape including a cone shape or a cylinder sized to slidably dispose within the contact the ram. The compression spring can alternately include any suitable type of biasing device including a leaf type spring, or an electrically conductive compressible material. The collet is herein described as a copper material due to the reduced expense of copper when the collet requires replacement due to wear. The collet, the receiver, the union nut, the conductive element housing, and the ram can alternately be provided of any suitable electrically conductive material including a copper alloy material, a carbon steel or a stainless steel. The conductive element housing can alternately be welded, press fit, or otherwise mechanically connected to the receiver.

The conductive element and conductivity detection circuit of the present invention can be modified to suit alternate stud gun designs without departing from the scope and gist of the present invention, although all of the present advantages may not be achieved. For example, stud welding guns having the collet or chuck electrically isolated from the stud gun body can be modified to have the conductive element connected to the collet or chuck. Studs can also be provided by a mechanical delivery device in place of the pneumatically driven device shown in FIG. 1. While a preferred and alternate embodiments have been disclosed, it will be appreciated that other configurations may be employed within the spirit and scope of the present invention. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A work piece attachment member delivery system, comprising:
    a gun body having a receiver and a collet mechanically and electrically connectable to the receiver;
    a ram moveably disposed in said receiver, said ram being electrically isolable from both said collet and said receiver at least when in a ram advanced position;
    a conductive element disposed in and electrically isolable from said receiver, said conductive element being biased into electrical contact with said ram; and
    an attachment member operably positioned in physical contact between said collet and said ram in said ram advanced position, said attachment member operably closing an electrical conductivity path including said conductive element, said ram, said attachment member, said collet, and said receiver;
    wherein said closed conductivity path is indicative of said attachment member positioned for welding.

2. The system of claim 1, wherein said collet comprises:
    a generally hollow tubular body having a fixed end adjacent to said receiver and a distal end through which said attachment member is moveably disposable for welding; and
    an attachment member holder contacting said attachment member.

3. The system of claim 2, further comprising:
    an air driven piston head operable to retract said ram from said ram advanced position to an attachment member receiving position; and
    a delivery tube attached to said receiver to operably deliver each of a plurality of said attachment members.

4. The system of claim 3, comprising an insulating layer disposed between said ram and said receiver to electrically isolate said ram from said receiver in both said ram advanced position and said attachment member receiving position.

5. The system of claim 1, wherein said conductive element further comprises:
    a housing releasably connectable to said receiver, said housing being an electrically nonconductive material;
    a conductive ball moveably disposed within said housing;
    a conductive spring connectable to said conductive ball; and
    an electrical conductor extendable from said spring.

6. The system of claim 5, wherein:
    said insulating layer includes an aperture located adjacent to said conductive element at least when said ram is in said ram advanced position, said spring being biased into electrical contact between said ball and said ram at said aperture in said insulation; and
    said spring and ball are metallic.

7. The system of claim 2, wherein said attachment member holder comprises a plurality of longitudinal slits permitting both radial expansion and contraction of said distal end about said attachment member.

8. The system of claim 5, further comprising an electrical ground connection disposed on said receiver, said ground connection being electrically connectable to said electrical conductor extendable from said spring to close said conductivity path.

9. A stud detection system comprising:
    an electrically conductive weld stud;
    a gun body having a conductive collet mechanically connectable to a conductive receiver;
    a ram slidably disposed in said receiver, said ram operably advancing from a ram retracted position to a ram advanced position;
    a conductive element disposed in and electrically isolable from said receiver, said conductive element biased into electrical contact with said ram when said ram is in at least said ram advanced position; and
    a conductivity detection circuit connectable between said conductive element and said stud welding gun, said conductivity detection circuit including a closed circuit condition having said conductive weld stud disposed between said ram and said collet when said ram is in said ram advanced position, and said conductivity detection circuit including an open circuit condition when said stud is absent between said ram and said collet.

10. The system of claim 9, further comprising:
    a welding current source connectable to said receiver; and
    said welding current source operably providing both an arcing current and a welding current through said ram to weld said stud to a work piece.

11. The system of claim 10, further comprising:
    a signal generating device connectable between said conductivity detection circuit and said welding current source; and said signal generating device operably generating a welding current actuation signal during said closed circuit condition of said conductivity detection circuit.

12. The system of claim 9, comprising a stud supply source in communication with said receiver to operably supply each said stud to said gun body.

13. The system of claim 9, comprising an electrical insulation layer circumferentially disposed about said ram to electrically isolate said ram from both said collet and said receiver.

14. The system of claim 11, comprising a pneumatic source connectable to said receiver and operable to position said ram between each of said ram retracted position and said ram advanced position.

15. The system of claim 14, comprising a process control unit having said signal generating device disposed therein.

16. A stud detection circuit comprising:
   a stud welding gun body having a releasably mounted conductive element, a body mounted ground connection and a collet;
   a conductivity detection circuit connectably disposed between said conductive element and said ground connection;
   said conductive element operably biased into contact with a ram slidably disposed in said gun body;
   a conductivity current path partially including said conductive element, said ram, said collet, said ground connection and said conductivity detection circuit in successive electrical communication; and
   said conductivity current path being closed by a conductive stud disposed in electrical communication between said ram and said collet.

17. The stud detection circuit of claim 16, comprising a conductive element housing disposed in said gun body movably retaining said conductive element.

18. The stud detection circuit of claim 16, comprising a pair of conductivity signal lines including a first signal line connectably disposed between said ground connection and said conductivity detection circuit, and a second signal line connectably disposed between said conductive element and said conductivity detection circuit.

19. The stud detection circuit of claim 16, comprising a releasable conductive connection operably joining said collet to said gun body.

20. The stud detection circuit of claim 16, comprising an electrical insulation layer circumferentially disposed about said ram to electrically isolate said ram from both said collet and said gun body.

21. A method of operating a welding gun with a stud, the method comprising:
   (a) mechanically and electrically connecting a first conductive portion of the gun to a second conductive portion of the gun;
   (b) advancing a third conductive portion of the gun to extend the stud toward the second conductive portion of the gun;
   (c) electrically isolating the third conductive portion from both the first and second conductive portions of the gun;
   (d) biasing a conductive element into contact with the third conductive portion of the gun;
   (e) conducting electrical current through a current path including the conductive element, the third conductive portion, the second conductive portion and the first conductive portion of the gun when the stud contacts the second conductive portion of the gun;
   (f) generating a welding current supply initiating signal when the electrical current flows through the current path; and
   (g) welding the stud when the electrical current supply initiating signal is generated.

22. The method of claim 21, comprising substantially preventing conduction of electrical current through the conductive element, the third conductive portion, the second conductive portion and the first conductive portion of the gun when the stud is absent.

23. The method of claim 21, comprising transferring both an arcing current and a welding current through the third conductive portion during the welding step.

24. The method of claim 21, comprising automatically loading the stud into the first conductive portion of the gun prior to the advancing step.

25. The method of claim 21, comprising connecting a welding current supply to the gun.

26. The method of claim 21, comprising positioning the gun adjacent to a work piece prior to the welding step.

27. A method of detecting a stud presence in a stud welding gun, the method comprising:
   mechanically and electrically joining at least a collet and a receiver of the stud welding gun to partially form a conductivity path;
   connecting a conductivity detection circuit in series with the partially formed conductivity path;
   attaching a biased conductive element to the stud welding gun, the conductive element in electrical communication with the conductivity detection circuit;
   electrically isolating a ram from both the collet and receiver;
   disposing the stud in the stud welding gun
   driving the stud with the ram until the ram is in electrical contact with the conductive element and the stud contacts the collet to close the conductivity path; and
   passing a conductivity current from the conductivity detection circuit through the conductivity path and the stud.

28. The method of claim 27, further comprising generating a stud present signal upon detection of the conductivity current with the conductivity detection circuit occurs.

29. The method of claim 27, further comprising signaling a pneumatic source to release the stud from a supply source.

30. The method of claim 27, further comprising electrically isolating the stud welding gun from a work piece.

* * * * *